(12) United States Patent
Selter

(10) Patent No.: US 11,938,711 B2
(45) Date of Patent: Mar. 26, 2024

(54) LAP SHEAR BONDING FIXTURE

(71) Applicant: Honeywell Federal Manufacturing & Technologies, LLC, Kansas City, MO (US)

(72) Inventor: Thomas Matthew Selter, Blue Springs, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 144 days.

(21) Appl. No.: 17/533,962

(22) Filed: Nov. 23, 2021

(65) Prior Publication Data

US 2023/0158789 A1    May 25, 2023

(51) Int. Cl.
*B32B 38/18* (2006.01)
*B29C 65/00* (2006.01)
*G01N 3/24* (2006.01)

(52) U.S. Cl.
CPC .......... *B32B 38/1833* (2013.01); *B29C 65/00* (2013.01); *B29C 66/00* (2013.01); *G01N 3/24* (2013.01)

(58) Field of Classification Search
None
See application file for complete search history.

(56) References Cited

U.S. PATENT DOCUMENTS

| | | | | |
|---|---|---|---|---|
| 5,916,469 | A  * | 6/1999 | Scoles ................ | B29C 65/5057 |
| | | | | 428/95 |
| 6,284,089 | B1 * | 9/2001 | Anderson ........... | B29C 66/8242 |
| | | | | 156/304.6 |
| 10,233,953 | B1 * | 3/2019 | McGann .................. | F16B 9/01 |
| 2009/0202294 | A1 * | 8/2009 | Apfel ....................... | F16B 5/00 |
| | | | | 156/92 |
| 2016/0009418 | A1 * | 1/2016 | Oberoi ..................... | B64C 1/06 |
| | | | | 403/345 |
| 2017/0002603 | A1 * | 1/2017 | Veerasamy ............ | C03C 27/08 |
| 2017/0361540 | A1 * | 12/2017 | Li .......................... | B29C 66/742 |

OTHER PUBLICATIONS

Disclosure from http://www.mttusa.net/.

* cited by examiner

*Primary Examiner* — Francisco W Tschen
*Assistant Examiner* — Abhishek A Patwardhan
(74) *Attorney, Agent, or Firm* — Hovey Williams LLP

(57) ABSTRACT

A fixture for lap shear bonding a bottom panel to a top panel comprises a bottom tool, a first spacer, a second spacer, and a top tool. The bottom tool has a quadrilateral shape including a top surface, a bottom surface, and four side surfaces and is configured to retain the bottom panel on the top surface. The first spacer is attached to the top surface of the bottom tool adjacent to one edge. The second spacer is attached to the top surface of the bottom tool adjacent to an opposing edge. The top tool has a quadrilateral shape including a top surface, a bottom surface, and four side surfaces and is configured to retain the top panel on the bottom surface. The top tool is further configured to attach to the first spacer and the second spacer such that the top panel contacts the bottom panel.

20 Claims, 14 Drawing Sheets

LAP SHEAR BONDING FIXTURE

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

FIELD OF THE INVENTION

Embodiments of the current invention relate to fixtures for lap shear bonding.

DESCRIPTION OF THE RELATED ART

Lap shear bonding involves the bonding, or joining, of two objects together in order to test a lap shear strength of an adhesive, epoxy, glue, or the like that creates the bond. Referring to FIG. 4, a portion of the testing process is illustrated. Two objects, such as a bottom panel and a top panel, have been bonded together using an adhesive, which has been applied to the surface of one or both panels where the two panels overlap and contact one another through the adhesive. A shear force is applied to the bonded panels. That is, a first force is applied to an edge of the bottom panel, and a second force is applied to an opposing edge of the top panel, wherein the forces are applied in opposing directions. The forces are applied until the bond breaks and the panels separate. The lap shear strength of the bond is determined from the force applied when the bond breaks and an area over which the adhesive was applied.

The panels are typically bonded to one another using a fixture, or apparatus, that includes a bottom tool, a top tool, a top shim, and a bottom shim. The shims provide the proper spacing between the bottom tool and the top tool to match the thickness of the two panels. The bottom shim and the bottom panel with adhesive already applied are positioned on the bottom tool. The top shim is positioned on the bottom panel, and the top panel with adhesive already applied is positioned on the bottom shim. The top tool is placed on the top shim and the top panel. Release sheets may also be used to separate the surfaces of the panels from the fixture components. After the top tool is placed, the assembly may be tightened to apply pressure to the bond between the two panels. One problem is that the shims and the panels may need to be carefully positioned to ensure alignment before the top tool is placed. And, since the top tool and the bottom tool are each full length, once the top tool is placed, the bond cannot be seen or accessed. Thus, it is not known whether the panels are properly aligned, whether excess adhesive has squeezed out, or whether there is uniform distribution of the adhesive in all areas of the bond.

SUMMARY OF THE INVENTION

Embodiments of the current invention address one or more of the above-mentioned problems and provide an advance in the art of lap shear bonding. The current invention provides a fixture and a method that utilize a bottom tool, a top tool, and spacers instead of shims. The spacers attach to the bottom tool along its sides in order to provide the proper spacing between the bottom tool and the top tool. The bottom panel attaches directly to the bottom tool, and the top panel attaches directly to the top tool, eliminating the need for careful positioning of the panels and the shims. In addition, the bottom tool has an opening and the top tool extends about half the length of the bottom tool so that when the top tool and the top panel are placed on the bottom tool and the bottom panel, the bond between the top panel and the bottom panel can be viewed from above and below. Alignment can be checked, excess adhesive can be wiped away, and the distribution of the adhesive in all areas of the bond between the top panel and the bottom panel can be checked.

An embodiment of the fixture broadly comprises a bottom tool, a first spacer, a second spacer, and a top tool. The bottom tool has a quadrilateral shape including a planar top surface, a bottom surface, and four side surfaces and is configured to retain the bottom panel on the top surface. The first spacer is attached to the top surface of the bottom tool adjacent to one edge, and the second spacer is attached to the top surface of the bottom tool adjacent to an opposing edge. The top tool has a quadrilateral shape including a top surface, a planar bottom surface, and four side surfaces and is configured to retain the top panel on the bottom surface. The top tool is further configured to attach to the first spacer and the second spacer such that a portion of the top panel contacts a portion of the bottom panel.

Another embodiment of the fixture broadly comprises a bottom tool, a first spacer, a second spacer, and a top tool. The bottom tool has a quadrilateral shape including a planar top surface, a bottom surface, and four side surfaces and is configured to retain the bottom panel on the top surface. The first spacer is attached to the top surface of the bottom tool adjacent to one edge, and the second spacer is attached to the top surface of the bottom tool adjacent to an opposing edge. The first spacer and the second spacer each have a thickness equal to the combined thicknesses of the bottom panel and the top panel. The bottom tool is configured to retain the bottom panel on the top surface between the first spacer and the second spacer. The top tool has a quadrilateral shape including a top surface, a planar bottom surface, and four side surfaces and is configured to retain the top panel on the bottom surface. The top tool is further configured to attach to the first spacer and the second spacer such that a portion of the top panel contacts a portion of the bottom panel.

An embodiment of the method broadly comprises attaching a first spacer and a second spacer to opposing edges of a top surface of a bottom tool; attaching the bottom panel to the top surface of the bottom tool in between the first spacer and the second spacer; attaching a top panel to a bottom surface of a top tool; applying an adhesive to either a portion of the bottom panel or a portion of the top panel; placing the top panel and the top tool on the bottom panel and the bottom tool; placing a first alignment pin and a second alignment pin in the top tool, the top panel, the bottom panel, and the bottom tool to align the bottom panel and the top panel; and attaching the top tool to the first spacer and the second spacer.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
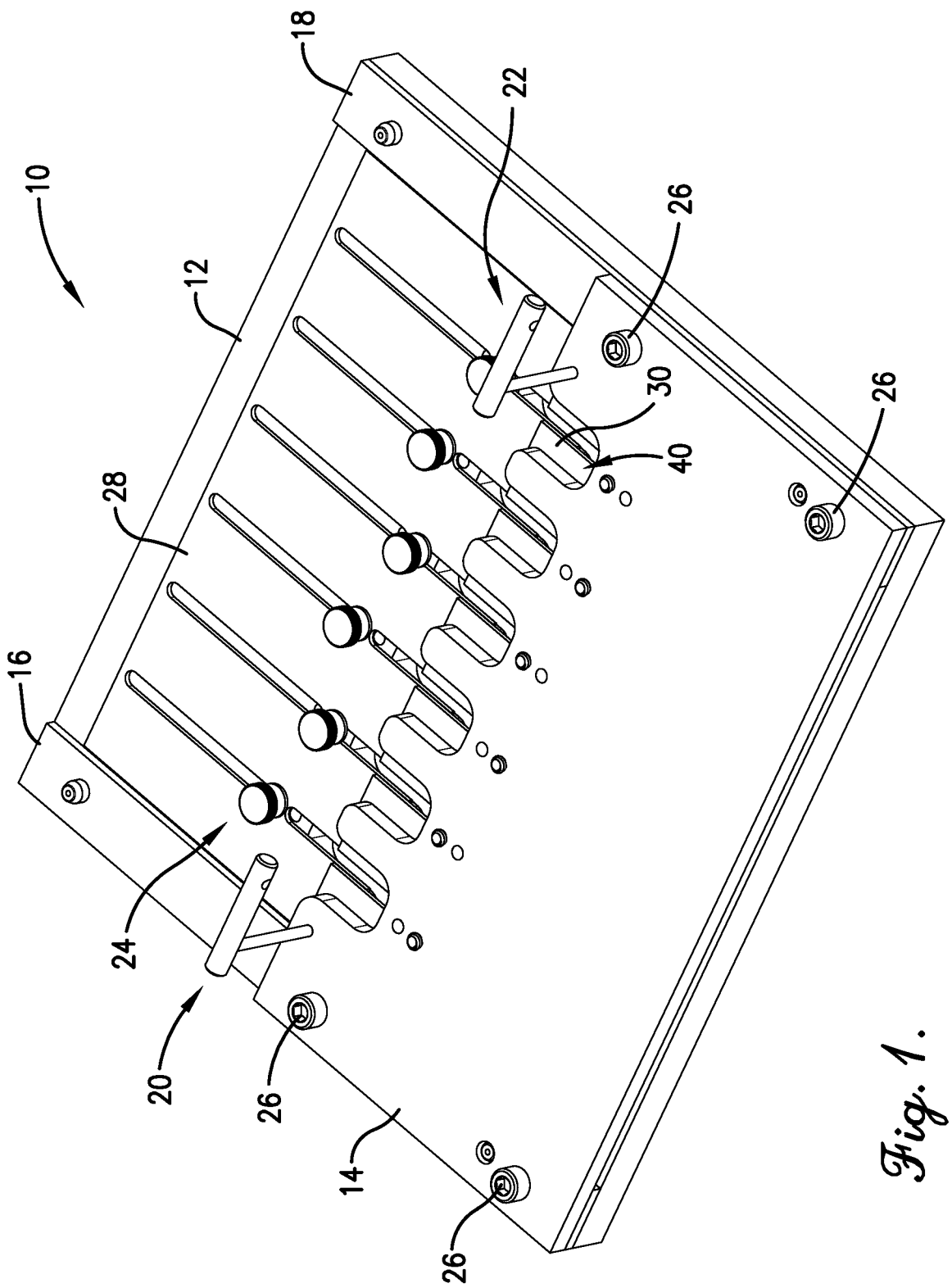
FIG. 1 is an upper perspective view of a fixture, constructed in accordance with various embodiments of the current invention, for lap shear bonding a bottom panel to a top panel.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Figure 2:
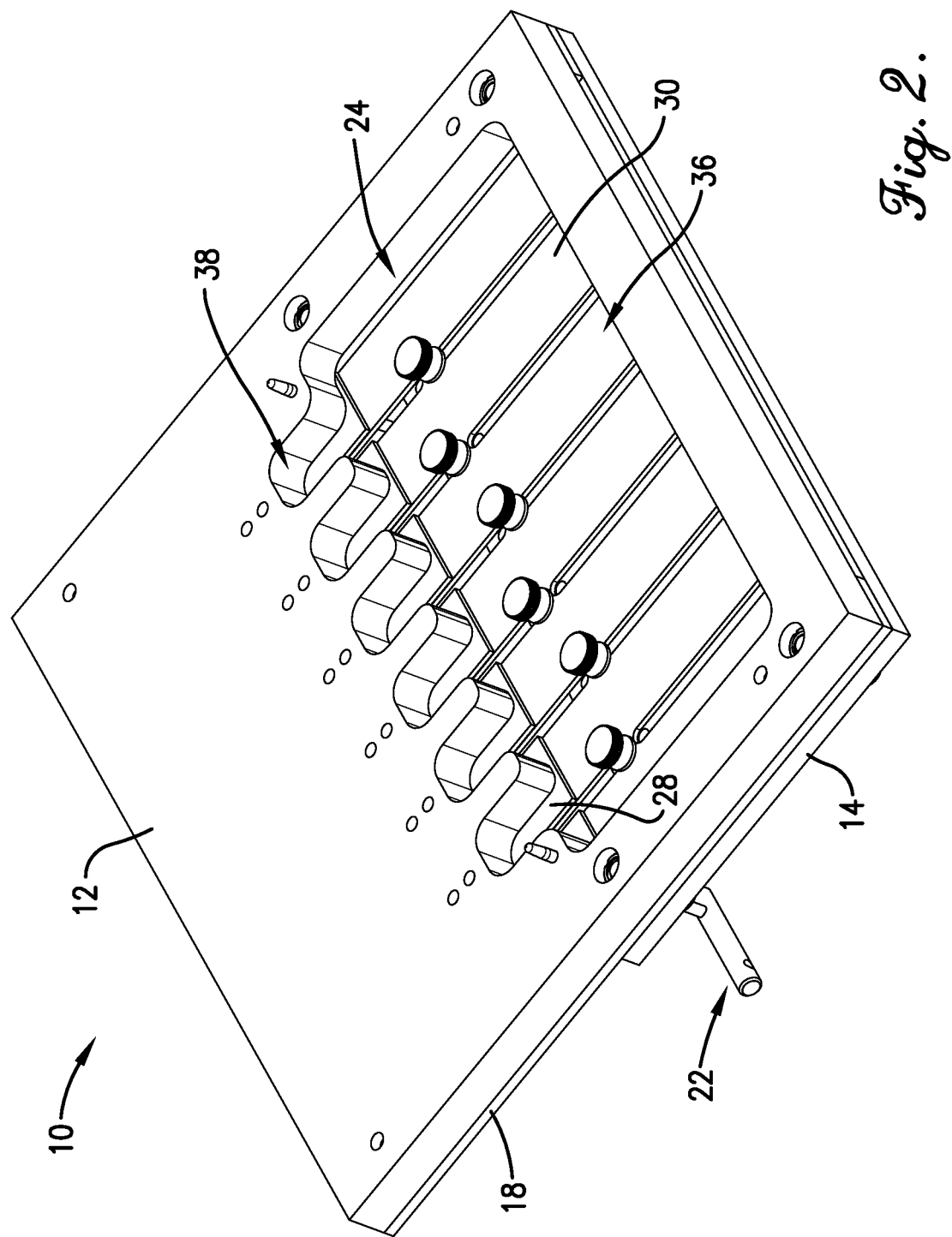
FIG. 2 is a lower perspective of the fixture.
Figure 3:
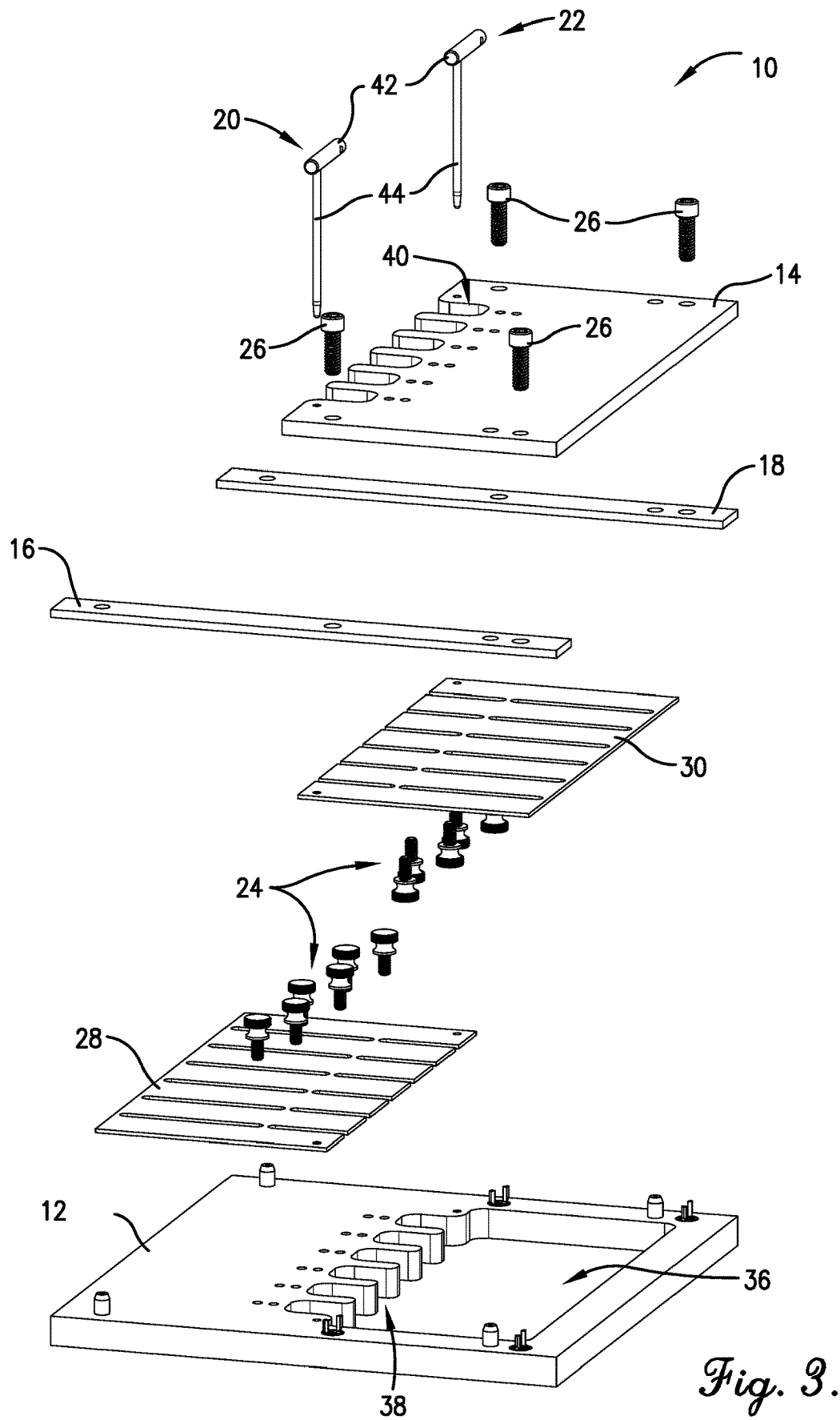
FIG. 3 is an exploded view of the fixture, illustrating the bottom panel, the top panel, a bottom tool, a top tool, a first spacer, a second spacer, a first alignment pin, a second alignment pin, a plurality of panel fasteners, and a plurality of top tool fasteners.

Referring to FIGS. 1-3, a fixture 10 for lap shear bonding, constructed in accordance with various embodiments of the current invention, is shown. The fixture 10 broadly comprises a bottom tool 12, a top tool 14, a first spacer 16, a second spacer 18, a first alignment pin 20, a second alignment pin 22, a plurality of panel fasteners 24, and a plurality of top tool fasteners 26. The fixture 10 is utilized to bond a bottom panel 28 to a top panel 30 in order to test the lap shear strength of an adhesive 32 (or epoxy, glue, or the like) used to create the bond.

Each panel 28, 30, as shown in FIGS. 1-4, 7, 8, and 10-13, is formed from material of relatively high strength so that the bond of the adhesive breaks before the panels 28, 30 break or tear. Typically each panel 28, 30 is formed from a metal or metal alloy. Each panel 28, 30 may be quadrilateral shaped with a thickness that is small compared to its surface area, resulting in each panel 28, 30 having a top surface, a bottom surface, and four side edges. Other shapes and relative dimensions of the panels 28, 30 are possible. Each panel 28, 30 may also include a plurality of slot openings cut into the panel 28, 30 from the top surface to the bottom surface. The slot openings are spaced apart from one another and may include a first group positioned adjacent to one side edge and a second group aligned with the first group and extending through an opposing side edge. The second group of slot openings also creates a plurality of spaced apart tabs 34. The slot openings allow for the bottom and top panels 28, 30 to be attached to the fixture 10, as described in more detail below. In addition, each panel 28, 30 includes a plurality of alignment or registration holes which receive the first and second alignment pins 20, 22.

The bottom tool 12, as shown in FIGS. 1, 2, 5-8, 12 and 13, generally retains the bottom panel 28 during the bonding process. The bottom tool 12 is typically formed from a metal or metal alloy and may be quadrilateral shaped with a planar top surface, a bottom surface, and four side surfaces. The bottom tool 12 includes a quadrilateral shaped opening 36 from the top surface to the bottom surface. The bottom tool 12 also includes a plurality of first fingers 38, spaced apart from one another and extending into one side of the opening 36. The bottom tool 12 may also include a plurality of other threaded openings and holes which receive screws and/or bolts. In addition, the bottom tool 12 includes a plurality of alignment or registration holes which receive the first and second alignment pins 20, 22.

The top tool 14, as shown in FIGS. 1, 2, and 9-13, generally retains the top panel 30 during the bonding process. The top tool 14 is typically formed from a metal or metal alloy and may be quadrilateral shaped with a top surface, a planar bottom surface, and four side surfaces. The top tool 14 includes a plurality of second fingers 40, spaced apart from one another and positioned along one side of the top tool 14. The top tool 14 may also include a plurality of other threaded openings and holes which receive screws and/or bolts. The top tool 14 has a width that is the same as a width of the bottom tool 12 and has a length that is roughly half a length of the bottom tool 12. In addition, the top tool 14 includes a plurality of alignment or registration holes which receive the first and second alignment pins 20, 22.

Each spacer 16, 18, as shown in FIGS. 1-3, 6-8, 12, and 13, generally provides a spacing between the bottom tool 12 and the top tool 14 during the bonding process. Each spacer 16, 18 is quadrilateral shaped and has a top surface, a bottom surface, and four side edges. Each spacer 16, 18 has a length that is the same as the length of the bottom tool 12 and has a width roughly equal to a distance from a side surface of the bottom tool 12 to the opening 36 in the bottom tool 12. Each spacer 16, 18 has a thickness that is equal to a total, or combined, thickness of the bottom panel 28 and the top panel 30. Alternatively, each spacer 16, 18 may have a thickness that is equal to one of a plurality of different values, such as 0.5 millimeter (mm), 1 mm, 1.5 mm, and so forth.

Each alignment pin 20, 22, as shown in FIGS. 1-3 and 13, generally provides alignment of the top tool 14 and the top panel 30 with the bottom tool 12 and the bottom panel 28. Each alignment pin 20, 22 includes a rod 42 and a handle 44. The rod 42 has an elongated cylindrical with a first end and a tapered second end. The handle 44 has a cylindrical shape with a length that is shorter than a length of the rod 42 and a diameter that is larger than a diameter of the rod 42. A first end of the handle 44 is attached to the first end of the rod 42.

The panel fasteners 24 include a first group that is used to attach the bottom panel 28 to the bottom tool 12 and a second group that is used to attach the top panel 30 to the top tool 14. Each panel fastener 24 is typically a threaded screw or bolt that includes an enlarged head, such as a thumb screw, or other feature that allows the panel fastener 24 to be handled and tightened easily.

The top tool fasteners 26 generally attach the top tool 14 to the bottom tool 12. Each top tool fastener 26 is typically a threaded screw or bolt that includes a head with screwdriver or hex key features or an enlarged head, such as a thumb screw.

Figure 5:
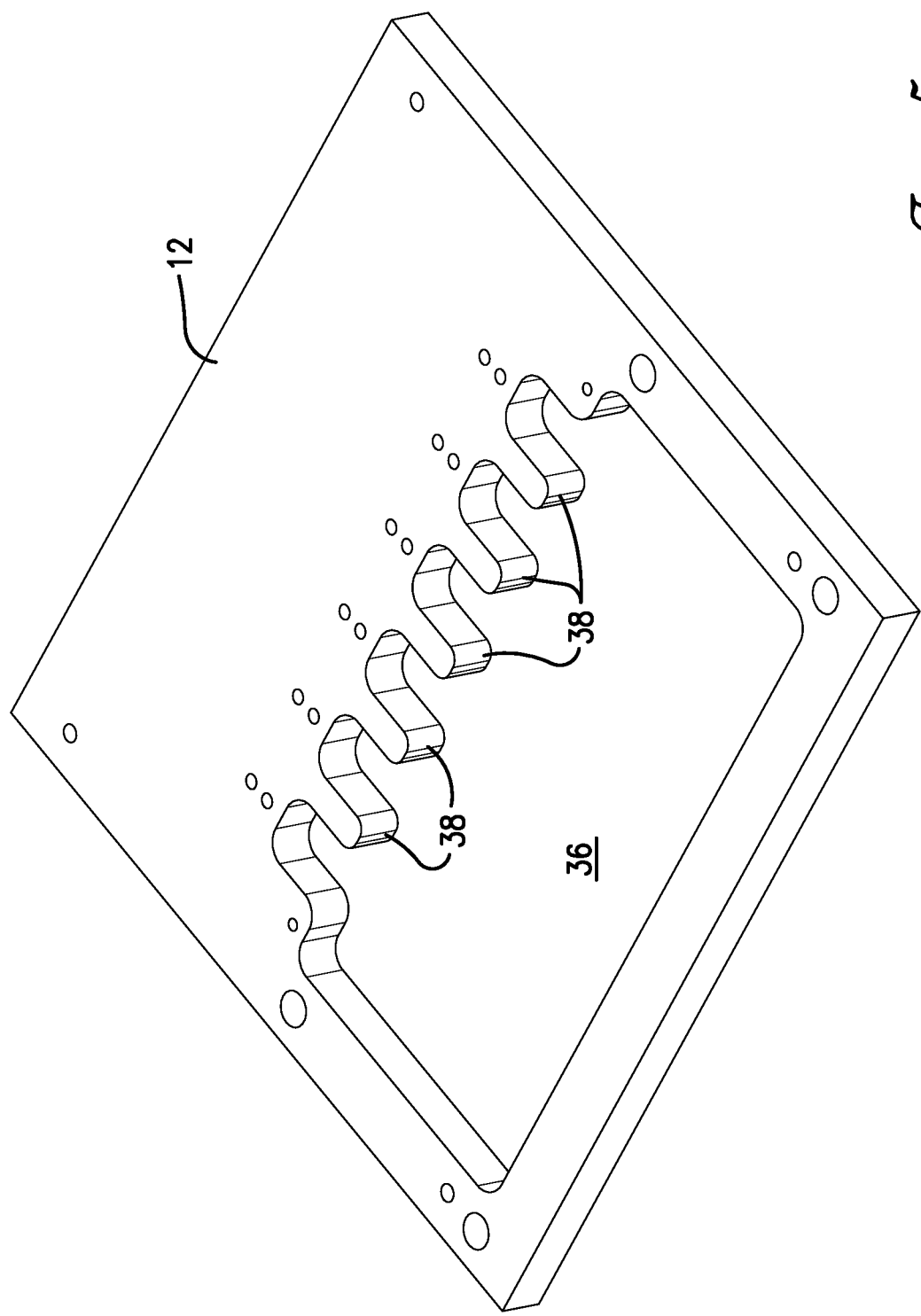
FIG. 5 is an upper perspective view of the bottom tool.
Figure 6:
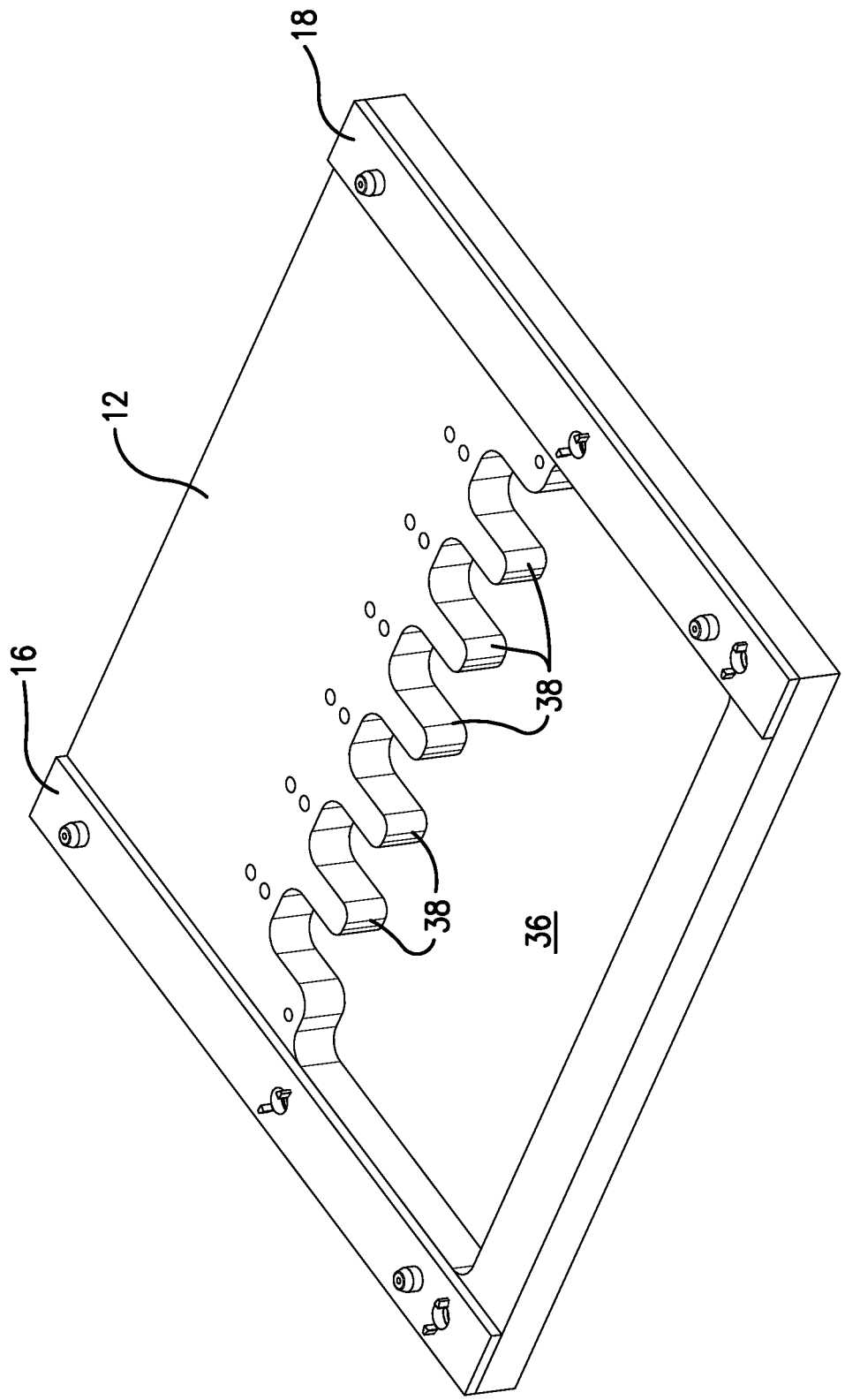
FIG. 6 is an upper perspective view of the bottom tool with the first and second spacers attached thereto.

The bonding process using the fixture 10 may be implemented as follows. Starting with the bottom tool 12, as shown in FIG. 5, the first and second spacers 16, 18 are attached thereto. The first spacer 16 may be attached to a left side of the bottom tool 12, and the second spacer 18 may be attached to a right side of the bottom tool 12, as shown in FIG. 6. The spacers 16, 18 are attached using threaded fasteners such as screws or bolts. The thickness of each spacer 16, 18 is generally equal to the total, or combined, thickness of the bottom panel 28 and the top panel 30. In other embodiments, each of the first spacer 16 and the second spacer 18 may include a plurality of spacers that are stacked one on top of another and have a total, or combined, thickness generally equal to the total, or combined, thickness of the bottom panel 28 and the top panel 30. For example, if the total thickness of the bottom panel 28 and the top panel 30 is 1 mm, then the first spacer 16 and the second spacer 18 may each include a single spacer having a thickness of 1 mm or may each include two spacers (with one stacked on top of the other) that have a total thickness of 1 mm.

Figure 7:
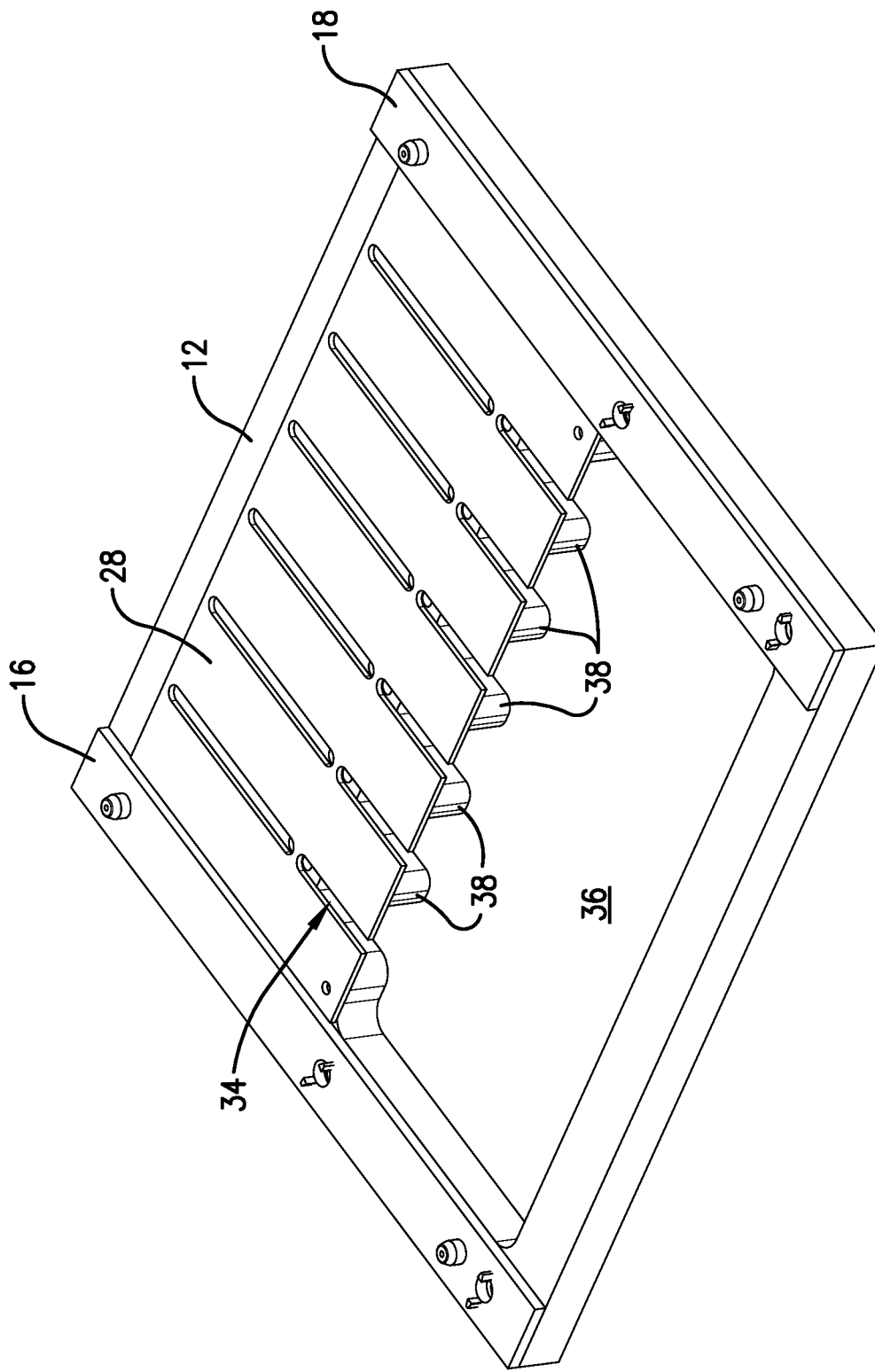
FIG. 7 is an upper perspective view of the bottom tool and the first and second spacers with the bottom panel placed on the bottom tool.
Figure 8:
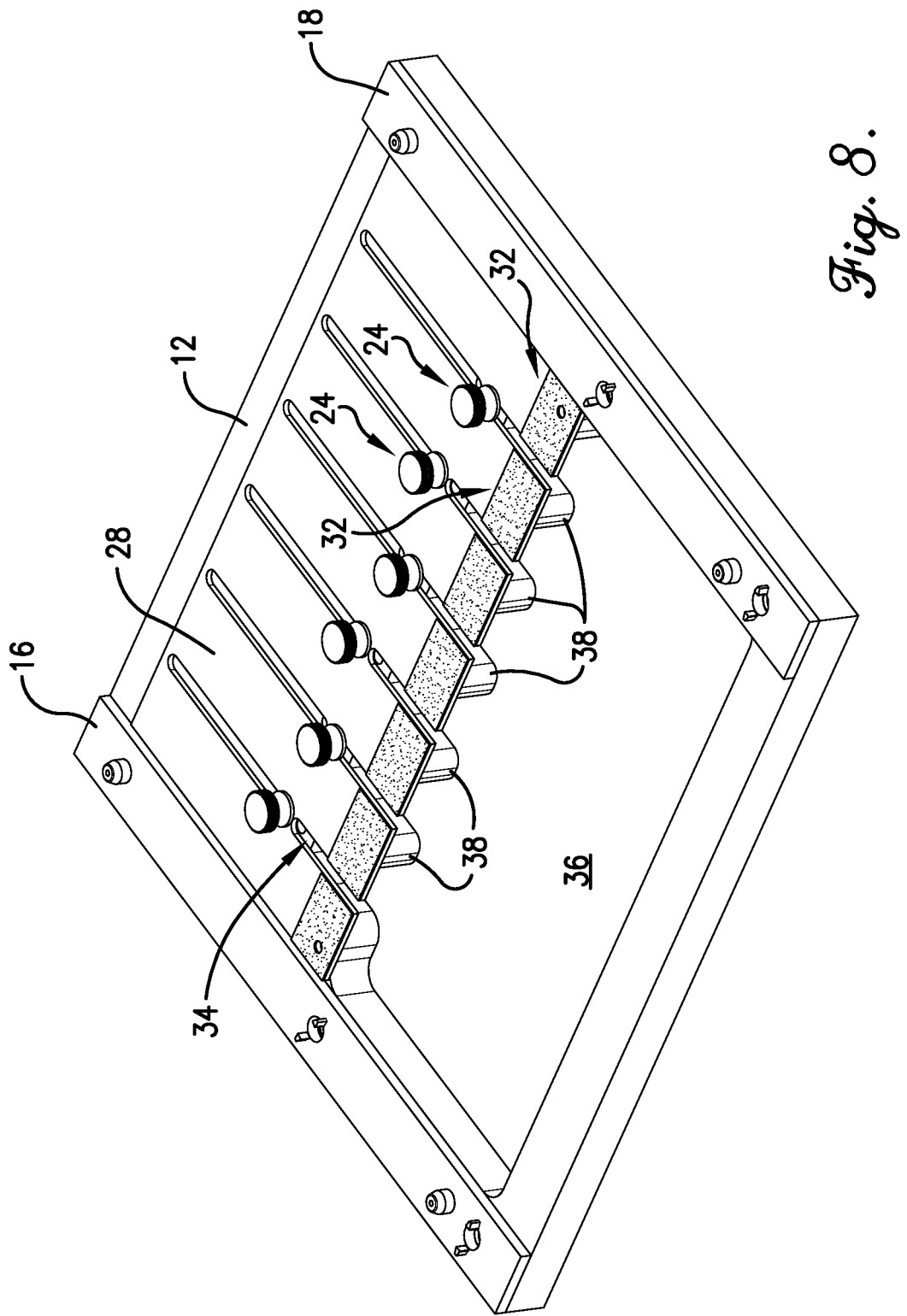
FIG. 8 is an upper perspective view of the bottom tool and the first and second spacers with the bottom panel attached the bottom tool using panel fasteners and an adhesive applied to a portion of the bottom panel.

The bottom panel 28 is placed on the top surface of the bottom tool 12 between the first spacer 16 and the second spacer 18 such that the first group of slot openings and the second group of slot openings are aligned with screw or bolt openings on the top surface of the bottom tool 12, as shown in FIG. 7. In addition, the tabs 34 of the bottom panel 28 align with the first fingers 38, and the second group of slot openings align with the spaces between the first fingers 38. Furthermore, the alignment holes of the bottom panel 28 should align with the alignment holes of the bottom tool 12. The first group of panel fasteners 24 is used to attach the bottom panel 28 to the bottom tool 12. The panel fasteners 24 may be staggered so that some of the panel fasteners 24 are inserted through the first group of slot openings and the rest of the panel fasteners 24 are inserted through the second group of slot openings, as shown in FIG. 8. The adhesive 32 is applied to the top surface of the tabs 34 on the bottom panel 28. In some embodiments, the adhesive 32 may be applied to only one of either the bottom panel 28 or the top panel 30.

Figure 9:
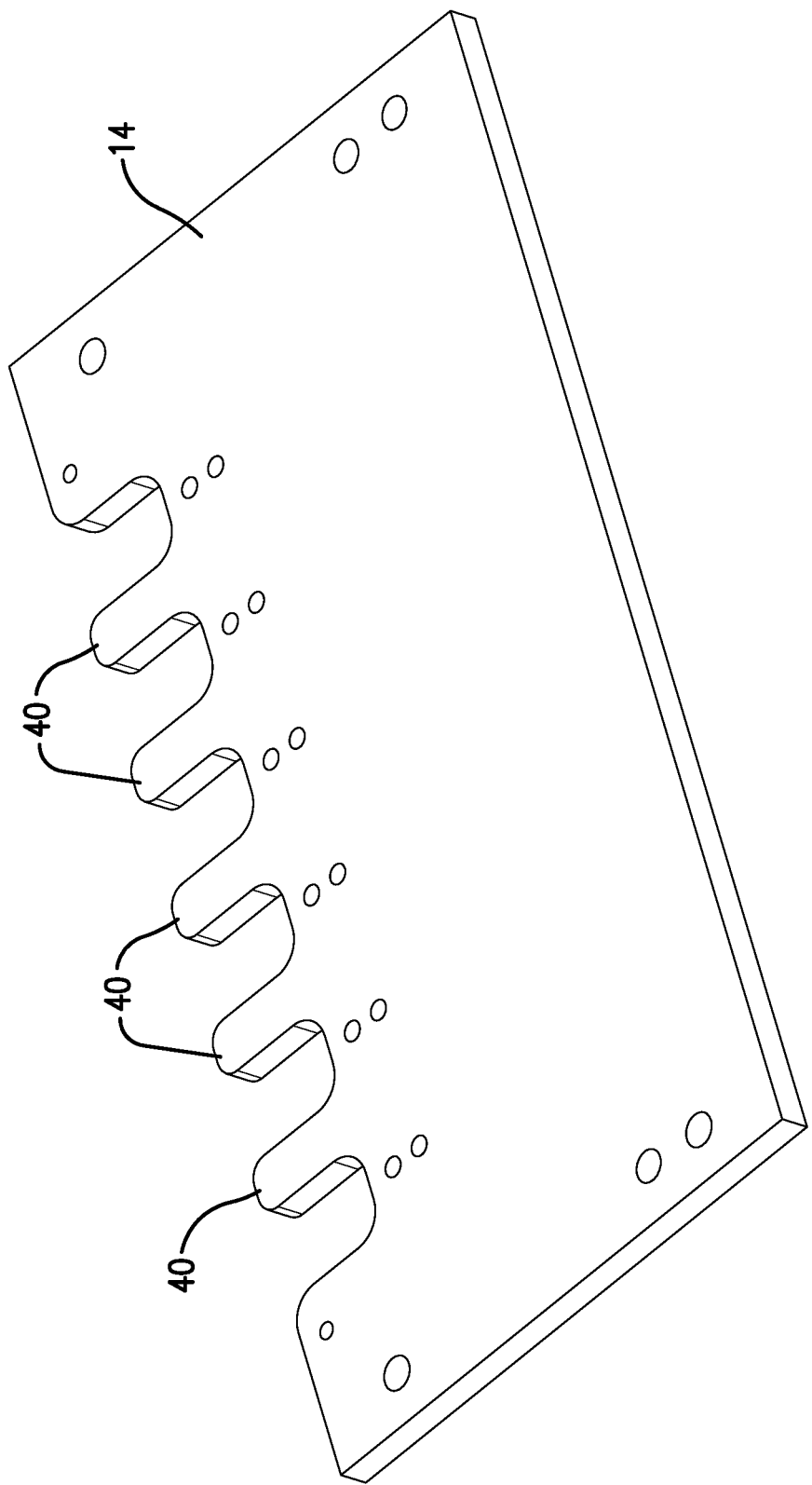
FIG. 9 is a lower perspective of the top plate.
Figure 10:
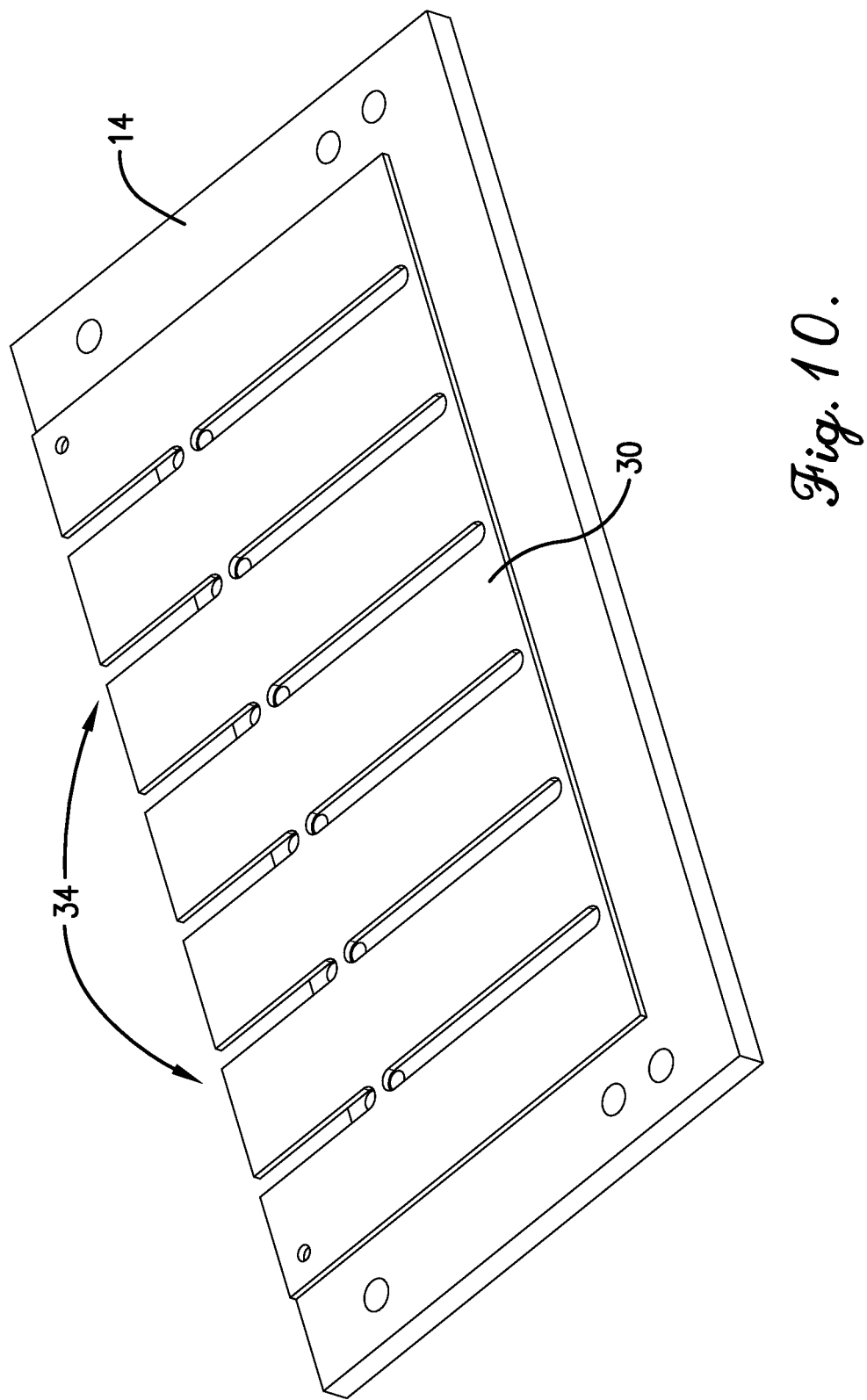
FIG. 10 is a lower perspective of the top plate with the top panel placed thereon.
Figure 11:
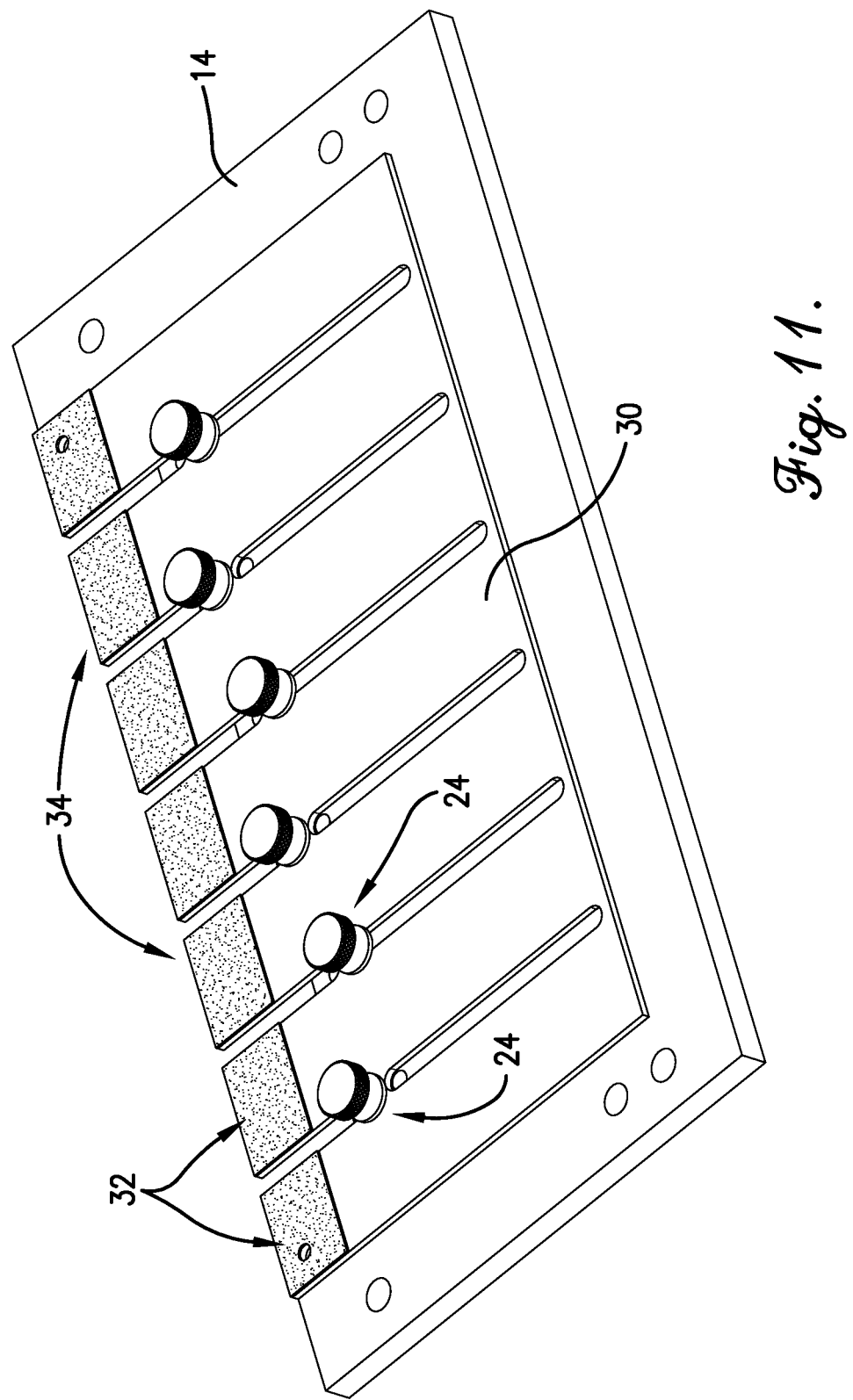
FIG. 11 is a lower perspective of the top plate with the top panel attached thereto using panel fasteners and the adhesive applied to a portion of the top panel.

With the bottom surface of the top tool 14 exposed, as shown in FIG. 9, the top panel 30 is placed thereon. The first group of slot openings and the second group of slot openings are aligned with screw or bolt openings on the bottom surface of the top tool 14, as shown in FIG. 10. In addition, the tabs 34 of the top panel 30 align with the second fingers 40, and the second group of slot openings align with the spaces between the second fingers 40. Furthermore, the alignment holes of the top panel 30 should align with the alignment holes of the top tool 14. The second group of panel fasteners 24 is used to attach the top panel 30 to the top tool 14. The panel fasteners 24 may be staggered so that some of the panel fasteners 24 are inserted through the first group of slot openings and the rest of the panel fasteners 24 are inserted through the second group of slot openings, as shown in FIG. 11. The adhesive 32 is applied to the bottom surface of the tabs 34 on the top panel 30. In some embodiments, the adhesive 32 may be applied to only one of either the bottom panel 28 or the top panel 30.

Figure 12:
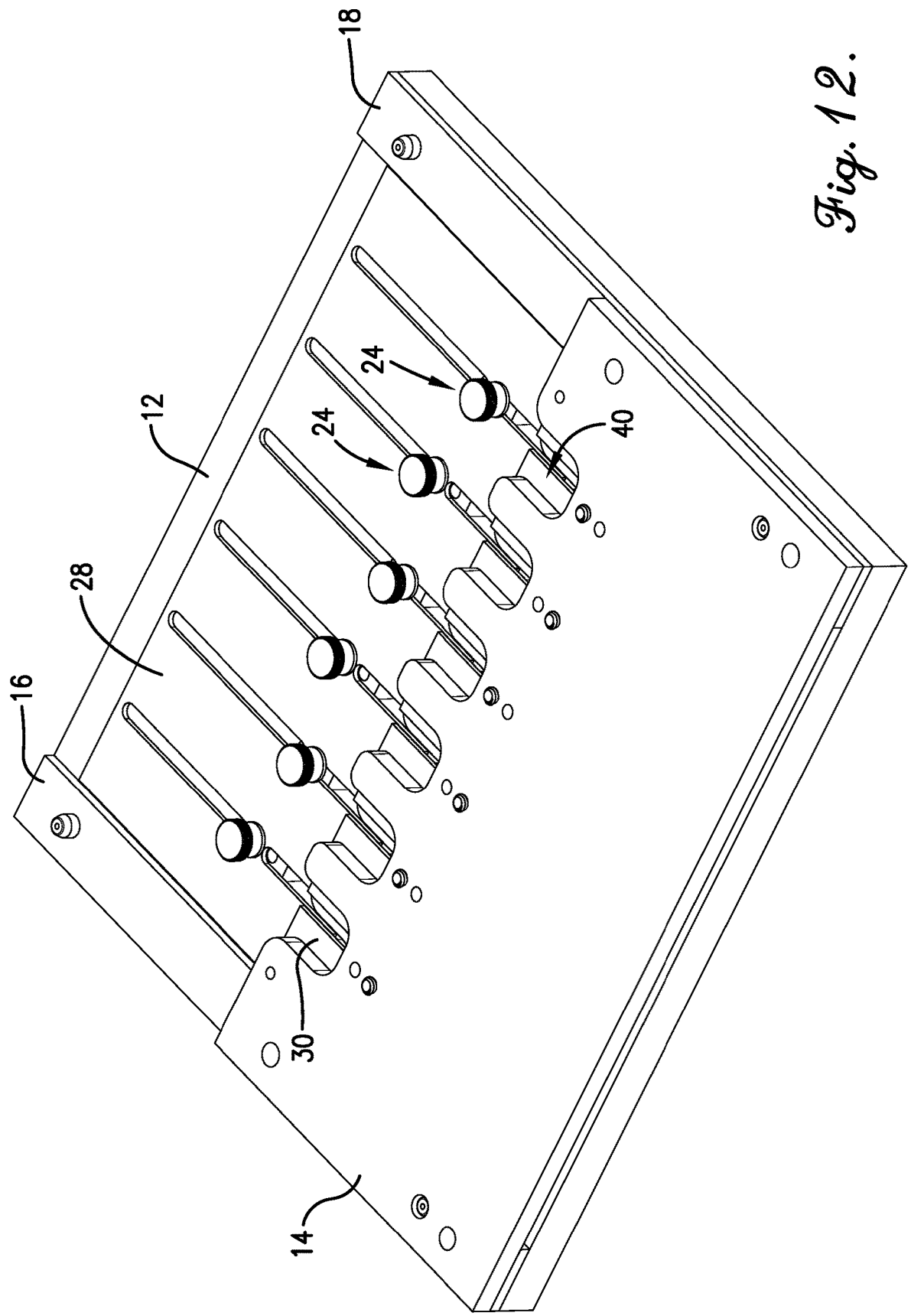
FIG. 12 is an upper perspective view of the top tool and the top panel placed on the bottom panel and the bottom tool.

The top tool 14 and the top panel 30 are placed on the bottom tool 12 and the bottom panel 28, as shown in FIG. 12. The top tool 14, the top panel 30, the bottom panel 28, and the bottom tool 12 may form a stack. The left and right sides of the bottom surface of the top tool 14 contact at least a portion of the upper surfaces of the first spacer 16 and the second spacer 18. The panel fasteners 24 that attach the top panel 30 to the top tool 14 extend through the opening 36 in the bottom tool 12, as best seen in FIG. 2. The opening 36 also allows for viewing of the contact between the bottom panel 28 and the top panel 30. In addition, the adhesive 32 applied to the top panel 30 contacts the adhesive 32 applied to the bottom panel 28. Or, in some embodiments, the adhesive 32 applied to just the bottom panel 28 or the top panel 30 contacts the tabs 34 of the other panel 28, 30. Furthermore, the top tool 14 and the top panel 30 are placed on the bottom tool 12 and the bottom panel 28 so that the alignment holes of the top tool 14 and the top panel 30 align with the alignment holes of the bottom tool 12 and the bottom panel 28.

Figure 13:
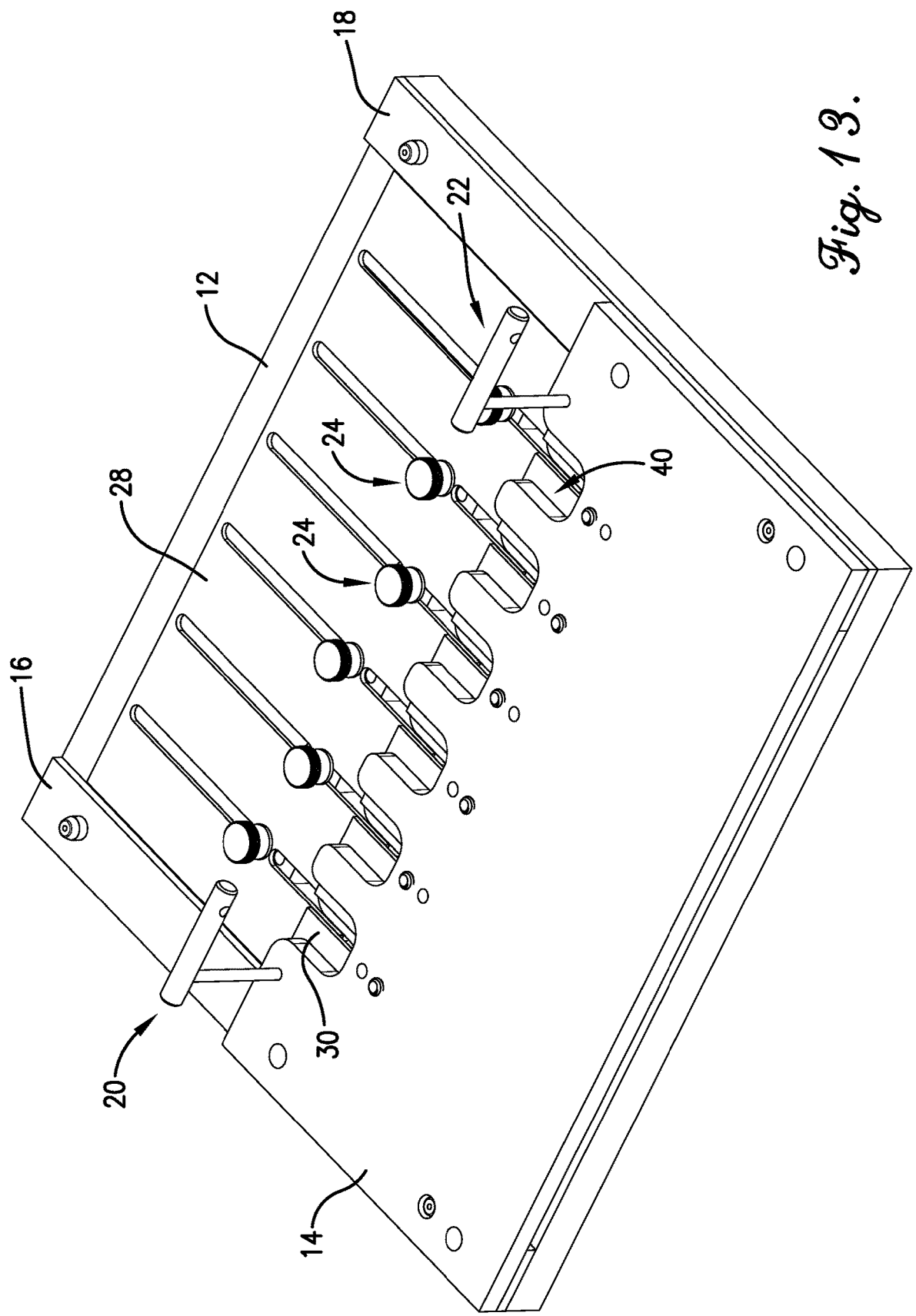
FIG. 13 is an upper perspective view of the top tool and the top panel placed on the bottom panel and the bottom tool with the alignment pins placed through the stack of components.

Referring to FIG. 13, the first alignment pin 20 is placed in the alignment holes on the left side of the stack of the top tool 14, the top panel 30, the bottom panel 28, and the bottom tool 12, and the second alignment pin 22 is placed in the alignment holes on the right side of the stack. The placement of the alignment pins 20, 22 in the alignment holes ensures that the bottom panel 28 and the top panel 30 are aligned laterally to provide maximum contact of the adhesive 32 with the bottom panel 28 and the top panel 30.

Figure 4:
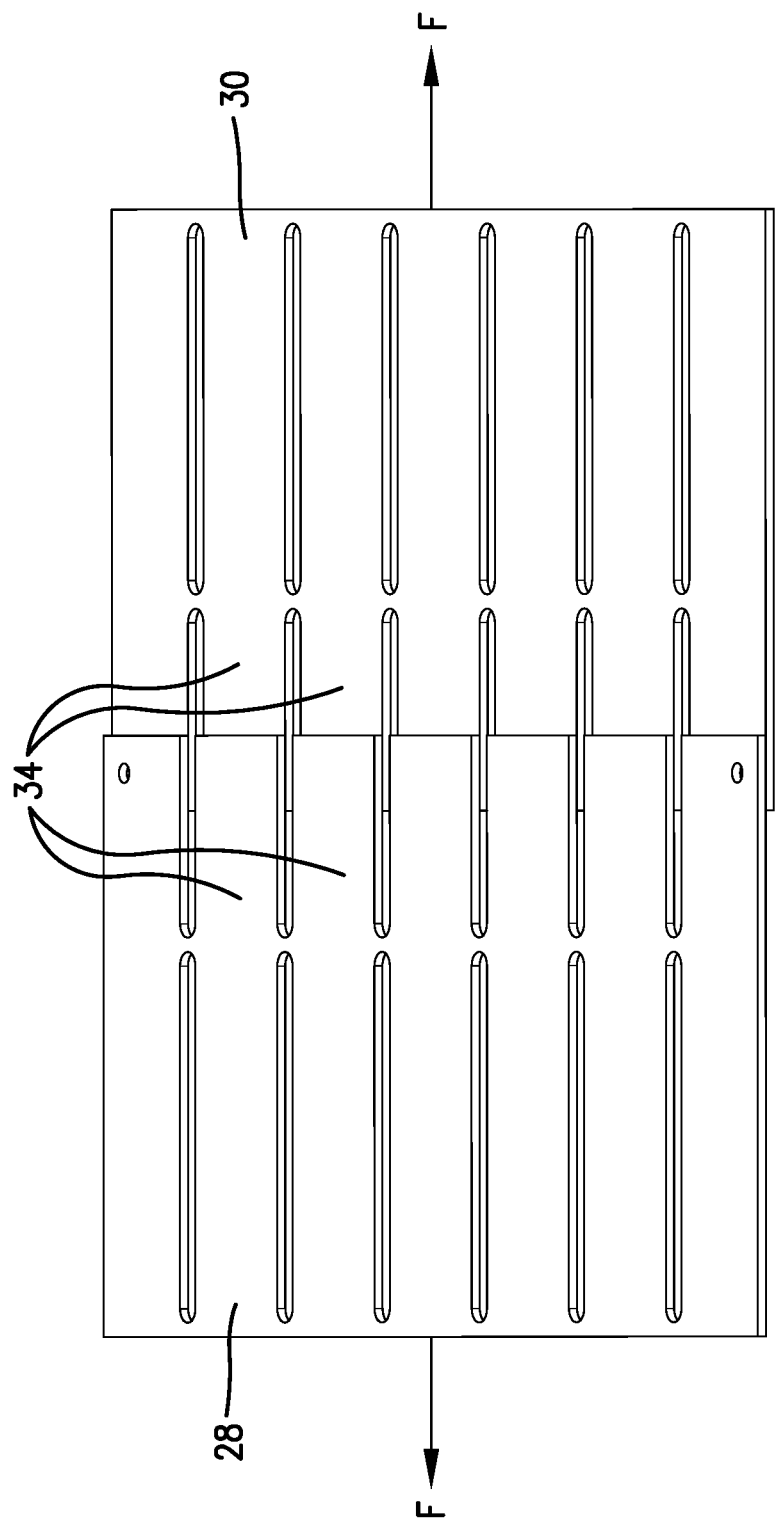
FIG. 4 illustrates a portion of a lap shear bond test of the bottom panel and the top panel.

Referring to FIGS. 1 and 2, the top tool fasteners 26 are used to firmly attach the top tool 14 to the first spacer 16 and the second spacer 18. The tightening of the top tool fasteners 26 also applies a force to press the top panel 30 onto the bottom panel 28. Specifically, the second fingers 40 apply a surface normal force to press the tabs 34 of the top panel 30 onto the tabs 34 of the bottom panel 28, which are supported by the first fingers 38. Some of the adhesive 32 may be pressed out during tightening of the top tool fasteners 26. The excess may be wiped away. Afterward, the fixture 10 and the panels 28, 30 are left alone to allow the adhesive 32 to cure. When the adhesive 32 has cured, the panels 28, 30 are removed from the fixture 10, and a shear test is applied, as shown in FIG. 4. The panels 28, 30 are pulled in opposing directions. The lap shear strength is determined from the force at which the panels 28, 30 separate and the area over which the adhesive 32 covers.

Figure 14:
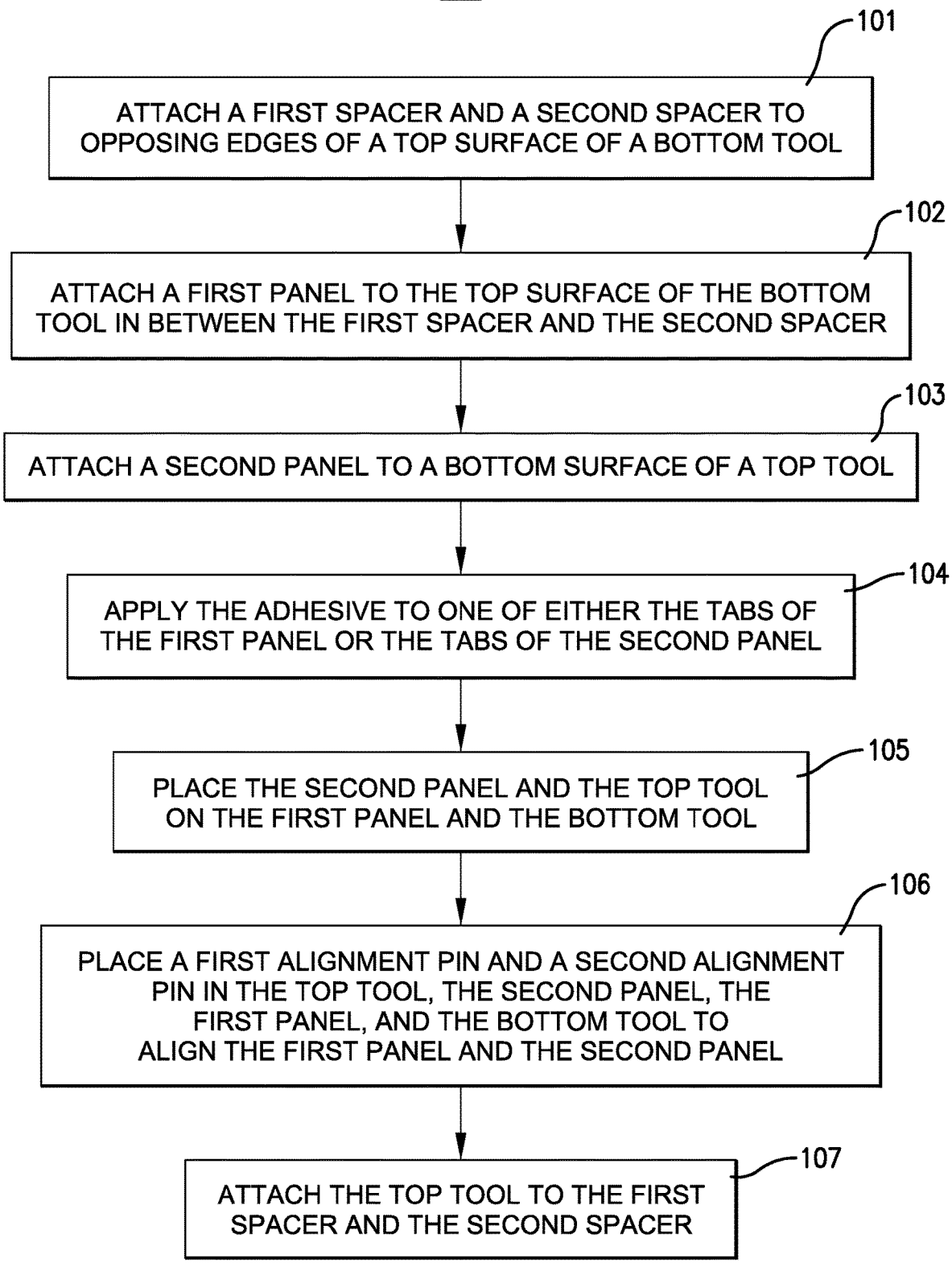
FIG. 14 is a listing of at least a portion of the steps of a method of lap shear bonding the bottom panel to the top panel.

FIG. 14 depicts a listing of at least a portion of the steps of an exemplary method 100 for lap shear bonding of a bottom panel 28 and a top panel 30 using an adhesive 32. The steps may be performed in the order shown in FIG. 14, or they may be performed in a different order. Furthermore, some steps may be performed concurrently as opposed to sequentially. In addition, some steps may be optional or may not be performed.

Referring to step 101 and FIGS. 5 and 6, a first spacer 16 and a second spacer 18 are attached to opposing edges of a top surface of a bottom tool 12. The bottom tool 12 is typically formed from a metal or metal alloy and may be quadrilateral shaped with a planar top surface, a bottom surface, and four side surfaces. The bottom tool 12 includes a quadrilateral shaped opening 36 from the top surface to the bottom surface, which allows for access to the top tool 14 and the top panel 30. The bottom tool 12 also includes a plurality of first fingers 38, spaced apart from one another and extending into one side of the opening 36. The bottom tool 12 may also include a plurality of other threaded openings and holes which receive screws and/or bolts. In addition, the bottom tool 12 includes a plurality of alignment or registration holes which receive the first and second alignment pins 20, 22.

Each spacer 16, 18 is quadrilateral shaped and has a top surface, a bottom surface, and four side edges. Each spacer 16, 18 has a length that is the same as the length of the bottom tool 12 and has a width roughly equal to a distance from a side surface of the bottom tool 12 to the opening 36 in the bottom tool 12. Each spacer 16, 18 has a thickness that is equal to a total, or combined, thickness of the bottom panel 28 and the top panel 30. Alternatively, each spacer 16, 18 may have a thickness that is equal to one of a plurality of different values, such as 0.5 millimeter (mm), 1 mm, 1.5 mm, and so forth. The first spacer 16 may be attached to a left side of the bottom tool 12, and the second spacer 18 may be attached to a right side of the bottom tool 12. The spacers 16, 18 are attached using threaded fasteners such as screws or bolts.

Referring to step 102 and FIGS. 7 and 8, a bottom panel 28 is attached to the top surface of the bottom tool 12 in between the first spacer 16 and the second spacer 18. The bottom panel 28 is typically formed from a metal or metal alloy and may be quadrilateral shaped with a thickness that is small compared to its surface area, resulting in each panel 28, 30 having a top surface, a bottom surface, and four side edges. The bottom panel 28 may also include a plurality of slot openings cut into the panel from the top surface to the bottom surface. The slot openings are spaced apart from one another and may include a first group positioned adjacent to one side edge and a second group aligned with the first group and extending through an opposing side edge. The second group of slot openings also creates a plurality of spaced apart tabs 34. In addition, the bottom panel 28 includes a plurality of alignment or registration holes.

The bottom panel 28 is placed on the top surface of the bottom tool 12 between the first spacer 16 and the second spacer 18 such that the first group of slot openings and the second group of slot openings are aligned with screw or bolt openings on the top surface of the bottom tool 12, as shown in FIG. 7. In addition, the tabs 34 of the bottom panel 28 align with the first fingers 38, and the second group of slot openings align with the spaces between the first fingers 38. Furthermore, the alignment holes of the bottom panel 28 should align with the alignment holes of the bottom tool 12. The first group of panel fasteners 24 is used to attach the bottom panel 28 to the bottom tool 12. The panel fasteners 24 may be staggered so that some of the panel fasteners 24 are inserted through the first group of slot openings and the rest of the panel fasteners 24 are inserted through the second group of slot openings, as shown in FIG. 8.

Referring to step 103 and FIGS. 9 and 10, a top panel 30 is attached to a bottom surface of a top tool 14. The top panel 30 is the same as, or substantially similar to, the bottom panel 28. The top tool 14 is typically formed from a metal or metal alloy and may be quadrilateral shaped with a planar top surface, a bottom surface, and four side surfaces. The top tool 14 includes a plurality of second fingers 40, spaced apart from one another and positioned along one side of the top tool 14. The top tool 14 may also include a plurality of other threaded openings and holes which receive screws and/or bolts. The top tool 14 has a width that is the same as a width of the bottom tool 12 and has a length that is roughly half a length of the bottom tool 12. In addition, the top tool 14 includes a plurality of alignment or registration holes.

The top panel 30 is placed is the top tool 14 so that the first group of slot openings and the second group of slot openings are aligned with screw or bolt openings on the bottom surface of the top tool 14, as shown in FIG. 10. In addition, the tabs 34 of the top panel 30 align with the second fingers 40, and the second group of slot openings align with the spaces between the second fingers 40. Furthermore, the alignment holes of the top panel 30 should align with the alignment holes of the top tool 14. The second group of panel fasteners 24 is used to attach the top panel 30 to the top tool 14. The panel fasteners 24 may be staggered so that some of the panel fasteners 24 are inserted through the first group of slot openings and the rest of the panel fasteners 24 are inserted through the second group of slot openings, as shown in FIG. 11.

Referring to step 104 and FIGS. 8 and 11, the adhesive 32 is applied to one of either the tabs 34 of the bottom panel 28 or the tabs 34 of the top panel 30. In some embodiments, the adhesive 32 may be applied to only one of either the bottom panel 28 or the top panel 30. In other embodiments, the adhesive 32 may be applied to both the bottom panel 28 and the top panel 30. When the adhesive 32 is applied to the bottom panel 28, it is applied to the top surface of the tabs 34 adjacent the edge thereof. When the adhesive 32 is applied to the top panel 30, it is applied to the bottom surface of the tabs 34 adjacent the edge thereof.

Referring to step 105 and FIG. 12, the top panel 30 and the top tool 14 are placed on the bottom panel 28 and the bottom tool 12. The top tool 14, the top panel 30, the bottom panel 28, and the bottom tool 12 may form a stack. The left and right sides of the bottom surface of the top tool 14 contact at least a portion of the upper surfaces of the first spacer 16 and the second spacer 18. The panel fasteners 24 that attach the top panel 30 to the top tool 14 extend through the opening 36 in the bottom tool 12, as best seen in FIG. 2. In addition, the adhesive 32 applied to the top panel 30 contacts the adhesive 32 applied to the bottom panel 28. Or, in some embodiments, the adhesive 32 applied to just the bottom panel 28 or the top panel 30 contacts the tabs 34 of the other panel 28, 30. Furthermore, the top tool 14 and the top panel 30 are placed on the bottom tool 12 and the bottom panel 28 so that the alignment holes of the top tool 14 and the top panel 30 align with the alignment holes of the bottom tool 12 and the bottom panel 28.

Referring to step 106 and FIG. 13, a first alignment pin 20 and a second alignment pin 22 are placed in the top tool 14, the top panel 30, the bottom panel 28, and the bottom tool 12 to align the bottom panel 28 and the top panel 30. The placement of the alignment pins 20, 22 in the alignment holes ensures that the bottom panel 28 and the top panel 30 are aligned laterally to provide maximum contact of the adhesive 32 with the bottom panel 28 and the top panel 30.

Referring to step 107 and FIGS. 1 and 2, the top tool 14 is attached to the first spacer 16 and the second spacer 18. Attachment is implement using the top tool fasteners 26. The tightening of the top tool fasteners 26 also applies a force to press the top panel 30 onto the bottom panel 28. Specifically, the second fingers 40 apply a surface normal force to press the tabs 34 of the top panel 30 onto the tabs 34 of the bottom panel 28, which are supported by the first fingers 38. Some of the adhesive 32 may be pressed out during tightening of the top tool fasteners 26. The excess may be wiped away. Afterward, the fixture 10 and the panels 28, 30 are left alone to allow the adhesive 32 to cure. When the adhesive 32 has cured, the panels 28, 30 are removed from the fixture 10, and a shear test is applied, as shown in FIG. 4. The panels 28, 30 are pulled in opposing directions. The lap shear strength is determined from the force at which the panels 28, 30 separate and the area over which the adhesive 32 covers.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A fixture for lap shear bonding a bottom panel to a top panel, the fixture comprising:
    a bottom tool having a quadrilateral shape including
        a planar top surface, a bottom surface, and four side surfaces,
        an opening and a plurality of fingers spaced apart from one another, positioned along one edge of the opening, and extending into the opening,
        the bottom tool configured to retain the bottom panel on the top surface;
    a first spacer and a second spacer, the first spacer attached to the top surface of the bottom tool adjacent to one edge, the second spacer attached to the top surface of the bottom tool adjacent to an opposing edge; and
    a top tool having a quadrilateral shape including a top surface, a planar bottom surface, and four side surfaces, the top tool configured to retain the top panel on the bottom surface, the top tool further configured to attach to the first spacer and the second spacer such that a portion of the top panel contacts a portion of the bottom panel,
    wherein the bottom panel includes a plurality of tabs spaced apart from one another and positioned along one edge of the bottom panel, and each finger is configured to be aligned with a successive one of the tabs and support the tab when the top tool, while retaining the top panel, is attached to the first spacer and the second spacer.

2. The fixture of claim 1, further comprising a first alignment pin and a second alignment pin, each alignment pin configured to extend through the top tool, the top panel, the bottom panel, and the bottom tool while the top tool is attached to the first spacer and the second spacer and the top tool is retaining the top panel and the bottom tool is retaining the bottom panel.

3. The fixture of claim 1, wherein the bottom panel is retained on the top surface of the bottom tool between the first spacer and the second spacer.

4. The fixture of claim 1, wherein the first spacer and the second spacer each have a thickness equal to the combined thicknesses of the bottom panel and the top panel.

5. The fixture of claim 1, wherein the top tool is configured to retain the top panel with a plurality of fasteners and the bottom tool includes an opening through which the fasteners extend when the top tool, while retaining the top panel, is attached to the first spacer and the second spacer.

6. The fixture of claim 1, wherein
    the top tool further includes a plurality of fingers spaced apart from one another and positioned along one edge of the top tool, and
    the top panel includes a plurality of tabs spaced apart from one another and positioned along one edge of the top panel,
    each finger configured to be aligned with a successive one of the tabs and support the tab when the top tool, while retaining the top panel, is attached to the first spacer and the second spacer.

7. A fixture for lap shear bonding a bottom panel to a top panel, the fixture comprising:
    a bottom tool having a quadrilateral shape including
        a planar top surface, a bottom surface, and four side surfaces,
        an opening and a plurality of fingers spaced apart from one another, positioned along one edge of the opening, and extending into the opening;
    a first spacer and a second spacer, the first spacer attached to the top surface of the bottom tool adjacent to one edge, the second spacer attached to the top surface of the bottom tool adjacent to an opposing edge, the first spacer and the second spacer each having a thickness equal to the combined thicknesses of the bottom panel and the top panel, and the bottom tool is configured to retain the bottom panel on the top surface between the first spacer and the second spacer; and
    a top tool having a quadrilateral shape including a top surface, a planar bottom surface, and four side surfaces, the top tool configured to retain the top panel on the bottom surface, the top tool further configured to attach to the first spacer and the second spacer such that a portion of the top panel contacts a portion of the bottom panel, wherein the bottom panel includes a plurality of tabs spaced apart from one another and positioned along one edge of the bottom panel, and each finger is configured to be aligned with a successive one of the tabs and support the tab when the top tool, while retaining the top panel, is attached to the first spacer and the second spacer.

8. The fixture of claim 7, further comprising a first alignment pin and a second alignment pin, each alignment pin configured to extend through the top tool, the top panel, the bottom panel, and the bottom tool while the top tool is attached to the first spacer and the second spacer and the top tool is retaining the top panel and the bottom tool is retaining the bottom panel.

9. The fixture of claim 7, wherein the top tool is configured to retain the top panel with a plurality of fasteners and the bottom tool includes an opening through which the fasteners extend when the top tool, while retaining the top panel, is attached to the first spacer and the second spacer.

10. The fixture of claim 7, wherein
the top tool further includes a plurality of fingers spaced apart from one another and positioned along one edge of the top tool, and
the top panel includes a plurality of tabs spaced apart from one another and positioned along one edge of the top panel,
each finger configured to be aligned with a successive one of the tabs and support the tab when the top tool, while retaining the top panel, is attached to the first spacer and the second spacer.

11. A fixture for lap shear bonding a bottom panel to a top panel, the fixture comprising:
a bottom tool having a quadrilateral shape including a planar top surface, a bottom surface, and four side surfaces, the bottom tool configured to retain the bottom panel on the top surface;
a first spacer and a second spacer, the first spacer attached to the top surface of the bottom tool adjacent to one edge, the second spacer attached to the top surface of the bottom tool adjacent to an opposing edge; and
a top tool having a quadrilateral shape including
a top surface, a planar bottom surface, and four side surfaces,
a plurality of fingers spaced apart from one another and positioned along one edge of the top tool,
the top tool configured to retain the top panel on the bottom surface, the top tool further configured to attach to the first spacer and the second spacer such that a portion of the top panel contacts a portion of the bottom panel,
wherein each finger is configured to be aligned with a successive one of the tabs and support the tab when the top tool, while retaining the top panel, is attached to the first spacer and the second spacer.

12. A fixture for lap shear bonding a bottom panel to a top panel, the fixture comprising:
a bottom tool having a quadrilateral shape including a planar top surface, a bottom surface, and four side surfaces, the bottom tool configured to retain the bottom panel on the top surface;
a first spacer and a second spacer, the first spacer attached to the top surface of the bottom tool adjacent to one edge, the second spacer attached to the top surface of the bottom tool adjacent to an opposing edge, the first spacer and the second spacer each having a thickness equal to the combined thicknesses of the bottom panel and the top panel, and the bottom tool is configured to retain the bottom panel on the top surface between the first spacer and the second spacer; and
a top tool having a quadrilateral shape including
a top surface, a planar bottom surface, and four side surfaces,
a plurality of fingers spaced apart from one another and positioned along one edge of the top tool,
the top tool configured to retain the top panel on the bottom surface, the top tool further configured to attach to the first spacer and the second spacer such that a portion of the top panel contacts a portion of the bottom panel,
wherein the top panel includes a plurality of tabs spaced apart from one another and positioned along one edge of the top panel, each finger configured to be aligned with a successive one of the tabs and support the tab when the top tool, while retaining the top panel, is attached to the first spacer and the second spacer.

13. A method for lap shear bonding a bottom panel to a top panel, the method comprising: attaching a first spacer and a second spacer to opposing edges of a top surface of a bottom tool; attaching the bottom panel to the top surface of the bottom tool in between the first spacer and the second spacer; attaching a top panel to a bottom surface of a top tool; applying an adhesive to either a portion of the bottom panel or a portion of the top panel; placing the top panel and the top tool on the bottom panel and the bottom tool; placing a first alignment pin and a second alignment pin in the top tool, the top panel, the bottom panel, and the bottom tool to align the bottom panel and the top panel; and attaching the top tool to the first spacer and the second spacer; wherein the bottom tool further includes an opening and a plurality of fingers spaced apart from one another, positioned along one edge of the opening, and extending into the opening, the bottom panel includes a plurality of tabs spaced apart from one another and positioned along one edge of the bottom panel, and each finger is aligned with a successive one of the tabs and supports the tab when the top tool is attached to the first spacer and the second spacer.

14. The method of claim 13, wherein the portion of the bottom panel and the portion of the top panel contact each other when the top tool is attached to the first spacer and the second spacer.

15. The method of claim 13, wherein the first spacer and the second spacer each have a thickness equal to the combined thicknesses of the bottom panel and the top panel.

16. The method of claim 13, wherein the bottom panel and the top panel each include a plurality of tabs spaced apart from one another and positioned along one edge of the panel and the adhesive is applied to one of either a portion of the tabs of the bottom panel or a portion of the tabs of the top panel.

17. The method of claim 13, wherein the bottom panel and the top panel each include a plurality of tabs spaced apart from one another and positioned along one edge of the panel and the adhesive is applied to a portion of the tabs of the bottom panel and a portion of the tabs of the top panel.

18. The method of claim 13, wherein the top panel is attached to the top tool using a plurality of fasteners and the bottom tool includes an opening through which the fasteners extend when the top tool is attached to the first spacer and the second spacer.

19. The method of claim 13, wherein the top tool further includes a plurality of fingers spaced apart from one another and positioned along one edge of the top tool, the top panel includes a plurality of tabs spaced apart from one another and positioned along one edge of the top panel, and each finger is aligned with a successive one of the tabs and supports the tab when the top tool is attached to the first spacer and the second spacer.

20. A method for lap shear bonding a bottom panel to a top panel, the method comprising: attaching a first spacer and a second spacer to opposing edges of a top surface of a bottom tool; attaching the bottom panel to the top surface of the bottom tool in between the first spacer and the second spacer; attaching a top panel to a bottom surface of a top tool; applying an adhesive to either a portion of the bottom panel or a portion of the top panel; placing the top panel and the top tool on the bottom panel and the bottom tool; placing a first alignment pin and a second alignment pin in the top tool, the top panel, the bottom panel, and the bottom tool to align the bottom panel and the top panel; and attaching the top tool to the first spacer and the second spacer; wherein the top tool further includes a plurality of fingers spaced apart from one another and positioned along one edge of the top tool, the top panel includes a plurality of tabs spaced apart from one another and positioned along one edge of the top panel, and each finger is aligned with a successive one of the tabs and supports the tab when the top tool is attached to the first spacer and the second spacer.

* * * * *